(No Model.)

J. W. HOWLETT.
COMB.

No. 523,665. Patented July 31, 1894.

Witnesses

Inventor
Joseph W. Howlett.

Attorney.

UNITED STATES PATENT OFFICE.

JOSEPH W. HOWLETT, OF MILTON, PENNSYLVANIA.

COMB.

SPECIFICATION forming part of Letters Patent No. 523,665, dated July 31, 1894.

Application filed November 25, 1891. Serial No. 413,126. (No model.)

*To all whom it may concern:*

Be it known that I, JOSEPH W. HOWLETT, a citizen of the United States of America, residing in Milton, in the county of Northumberland, in the State of Pennsylvania, have invented certain new and useful Improvements in Combs, of which the following is a specification.

My invention relates to improvements in combs, and more particularly to the class of combs made by vulcanizing rubber or other plastic material in a mold.

It is well known that the so called "rubber" combs, celluloid combs, and all others made by molding a plastic substance are very desirable, owing to their cheapness in manufacture, and being very pleasant in use in view of their lightness, pliability and smoothness of surface. However, a serious objection to this class of combs is found in their liability to snap and break when subjected to slight strain.

The object of this invention is to provide a comb combining all the advantages of the strength and durability of metallic combs and the smoothness of surface and other desirable qualities of rubber combs, and the invention consists in an improved comb formed or made up of an inner metallic comb frame or blank, constituting a core having the teeth integral with the back and provided with perforations and a covering of indurated plastic material over the whole core and united through the perforations in the back piece.

Figure 1:
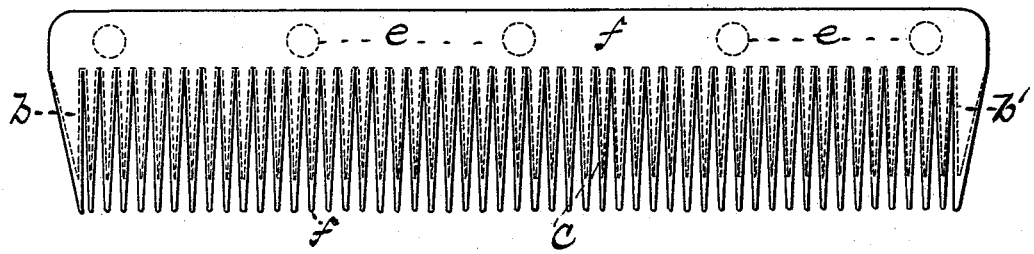
Figure 2:
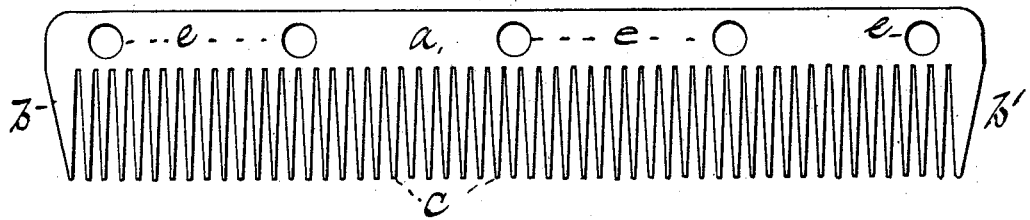
Figure 3:
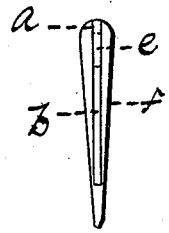
Figure 4:

In the accompanying drawings: Figure 1 is a side view of a comb embodying my invention. Fig. 2 is a view of the metallic frame or core. Fig. 3 is an end view. Fig. 4 is an edge view of the comb back.

A designates the metallic core having a back-piece $a$, and teeth $b$, $b'$, and intermediate teeth $c$, all of said teeth being integral with the back. The plastic material $f$, is molded upon the frame or core and afterward vulcanized.

To insure a thorough adhesion of the plastic material to the core, I provide the latter with a number of perforations $e$, so that when the plastic material is compressed upon the metallic core by the means usually employed in molding combs, it will be forced through the perforations and firmly unite the plastic material on opposite sides of the metal core, as indicated in dotted lines in Fig. 1 of the drawings.

It will be perceived that the construction above described will afford a strong and durable comb, in which are fully preserved the advantages of a smooth surface, and retaining sufficient strength and resiliency to insure convenient and agreeable use.

What I claim is—

A comb composed of a metallic core or frame consisting of a back-piece having integral end and intermediate teeth and provided with perforations, and a plastic covering extending entirely over the metallic frame and united through the perforations and vulcanized thereon, substantially as specified.

In witness whereof I have hereto set my hand in the presence of two attesting witnesses.

JOSEPH W. HOWLETT.

Witnesses:
 I. F. GAUGER,
 O. T. NAGLE.